United States Patent [19]

Macy

[11] 3,787,081
[45] Jan. 22, 1974

[54] BARREL KNOT TYING DEVICE

[76] Inventor: Carl L. Macy, 2708 N. 84th St., Milwaukee, Wis. 53222

[22] Filed: June 8, 1972

[21] Appl. No.: 260,820

[52] U.S. Cl. .............................................. 289/17
[51] Int. Cl. ............................................. D03j 3/00
[58] Field of Search ..................................... 289/17

[56] References Cited
UNITED STATES PATENTS

| 2,469,037 | 5/1949 | Harvey | 289/17 |
| 2,498,920 | 2/1950 | Holland | 289/17 |
| 2,502,751 | 4/1950 | Roberts | 289/17 |
| 3,169,787 | 2/1965 | Zolezzi | 289/17 |
| 3,606,405 | 9/1971 | Lally | 289/17 |

Primary Examiner—Louis K. Rimrodt
Attorney, Agent, or Firm—Ira Milton Jones

[57] ABSTRACT

A knot typing device consisting of complementary inner and outer U-shaped plastic moldings, connected for relative rotation about an axis passing through the distal portions of their arms, the inner U-shaped member having an integral post between and in alignment with its spaced arms to lie between parallel stretches of a pair of lines that approach one another from opposite ends of the device and are laid into communicating slots in the extremities of the arms of both U-shaped members so that upon relative rotation of the two U-shaped members while said stretches of the lines are at opposite sides of the post and are held taut by anchoring the ends thereof to the outer U-shaped member, said stretches are wound upon one another in preparation for the completion of a barrel knot tying said pair of lines together.

9 Claims, 7 Drawing Figures

PATENTED JAN 22 1974 3,787,081
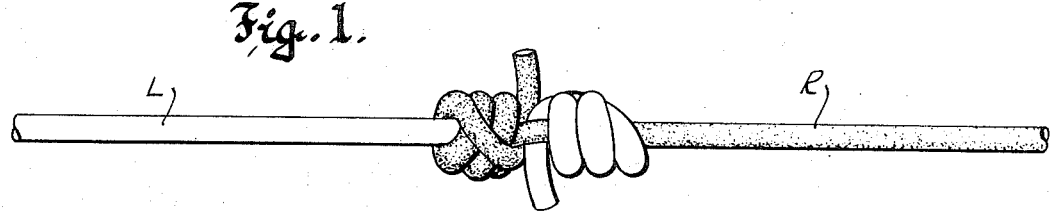
Fig. 1.
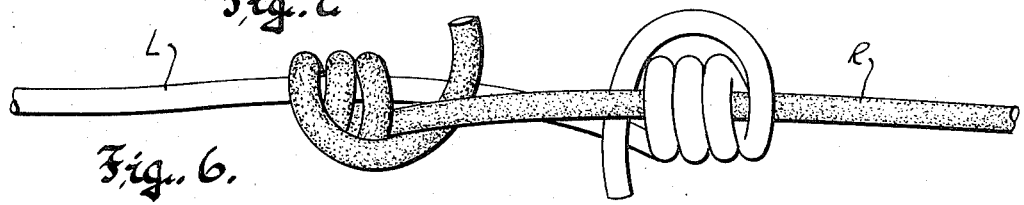
Fig. 2.
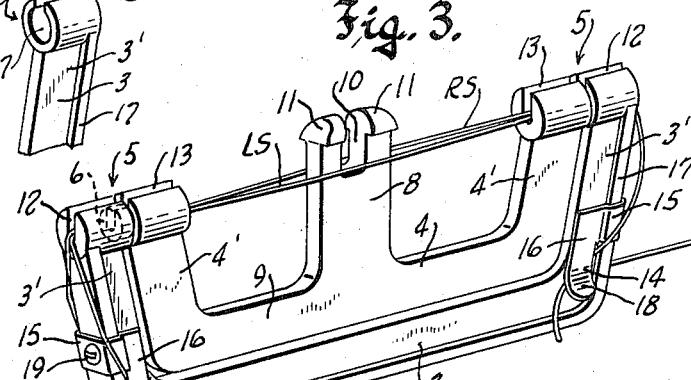
Fig. 6.
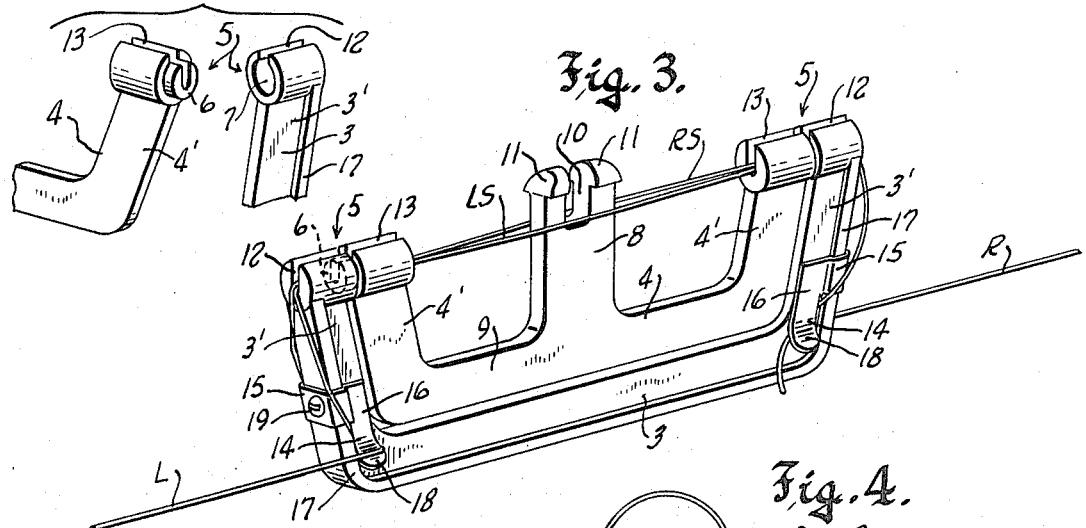
Fig. 3.
Fig. 4.
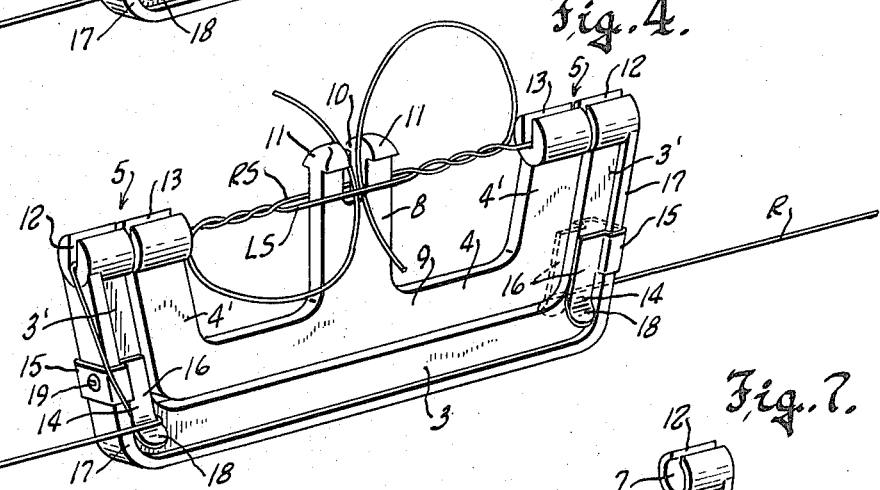
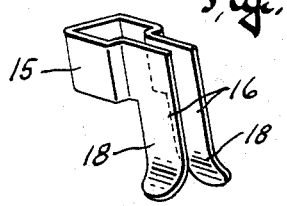
Fig. 5.
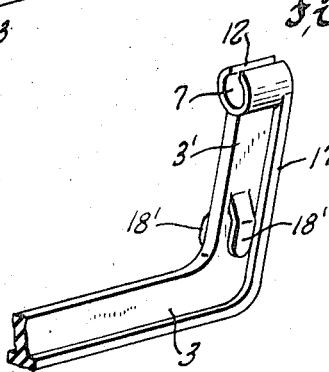
Fig. 7.

BARREL KNOT TYING DEVICE

This invention relates to knot tying devices, and has as its purpose to provide an inexpensive easily manipulated device with which anyone can quickly form a barrel knot between two lines of even the most difficult-to-tie material such as monofilament used extensively by fishermen.

A barrel knot — sometimes called a blood knot — is about the only kind of knot that can be used to tie nylon and monofilament lines together, but it is a most difficult knot to tie. Exceptional dexterity and the most ideal conditions are essential to success, but unfortunately the fisherman faced with the need for tying a broken monofilament line out in the cold, wet weather, in a boat that is pitching about, lacks both of these attributes — especially if his luck in fishing has been bad.

Devices to facilitate the tying of barrel knots have been devised before, as evidenced by the U.S. Pat. to Harvey Nos. 2,469,037 and 2,518,687, Holland U.S. Pat. No. 2,498,920, Tarbox et al U.S. Pat. No. 2,807,487 and Bethune Jr. U.S. Pat. No. 2,947,558, but all of these past expedients lacked the simplicity and ease of operation needed to make them practical and useable under the adverse conditions so often encountered by fishermen.

It is therefore the object of this invention to provide an improved barrel knot tying device which can be successfully used to tie a barrel knot between monofilament lines even under the most trying conditions and which fits easily into a fisherman's tackle box or pocket.

It is also an object of this invention to provide a barrel knot tying device which comprises essentially only two inexpensively produced plastic moldings held assembled by the inherent resilience of the material of which they are molded.

With these observations and objectives in mind, the manner in which the invention achieves its purpose will be appreciated from the following description and the accompanying drawing, which exemplifies the invention, it being understood that changes may be made in the specific apparatus disclosed herein without departing from the essentials of the invention set forth in the appended claims.

The accompanying drawing illustrates one complete example of the embodiment of the invention constructed according to the best mode so far devised for the practical application of the principles thereof and in which:

FIG. 1 illustrates the finished knot produced with the aid of the knot tying device of this invention;

FIG. 2 shows the same knot before it is pulled tight;

FIG. 3 is a perspective view of the knot tying device with the free end portions of two lines in place thereon preparatory to manipulation of the device to produce a barrel knot by which the lines will be tied together;

FIG. 4 is a perspective view similar to FIG. 3 but showing the lines twisted or wound about each other as a result of manipulation of the knot tying device and the free end portions of the lines inserted between the medial portions of the twisted part of the lines as required in the formation of a barrel knot;

FIG. 5 is a perspective view of one of the line anchors of the device, but shown detached therefrom;

FIG. 6 is a fragmentary exploded perspective view showing the details of the pivotal connection between the outer and inner U-shaped members which together constitute essentially the entire knot tying device; and FIG. 7 is a perspective view of a portion of the outer U-shaped frame member of the device illustrating a modified form of line anchor.

Referring to the accompanying drawing, the knot shown in FIG. 1, usually called a barrel knot and sometimes a blood knot, has the appearance shown in FIG. 2 before it is pulled tight. The lines being tied together are brought into the FIG. 2 condition by manipulation of the knot tying device of this invention. That device comprises an outer U-shaped member 3, which may be considered the main frame of the device, and an inner U-shaped member 4 embraced thereby. The end portions of the arms 3' and 4' of the two U-shaped members are contiguous and are maintained in that relationship by pivotal connections therebetween. By virtue of those pivotal connections, indicated generally by the numeral 5, the inner U-shaped member is freely rotatable with respect to the outer main frame member about an axis that passes through the contiguous end portions of their arms. Specifically, the pivotal connections 5 comprise coaxial cylindrical protuberances or bosses 6 that project outwardly from the arms 4' into sockets 7 that open to the inner faces of the arms 3'.

A post 8 extends from the bight portion 9 of the inner U-shaped member medially between its arms 4' and in coplanar alignment therewith, beyond or above the axis of the pivotal connection between the two U-shaped members. The distal end of this post is bifurcated or notched to provide an access opening 10 which extends beneath the pivot axis, and preferably the extremity of the post has an enlargement or knob 11 formed thereon.

The arms 3' and 4' have slots 12 and 13, respectively, opening to their extremities. The bottom of each of these slots is preferably round and concentric to the axis of the pivotal connection between the U-shaped members. When the inner and outer U-shaped members are coplanar, these slots are aligned and form continuations of one another.

Line anchors 14 are fixed to the outer U-shaped main frame member 3. These line anchors may be provided by U-shaped metal clips 15, the arms 16 of which are so spaced and shaped that they snap over the edge of the main frame member 3 which preferably has a reinforcing bead 17 projecting from each side thereof. The arms 16 of the clips 15 have spring fingers 18 extending therefrom to overly and resiliently bear against the adjacent sides of the frame member; and the extremeties of these spring fingers are flared outwardly to facilitate wedging lines under the fingers. The clips 15 are secured in place by screws 19 that pass through the bights of the U-shaped clips and are threaded into the main frame member.

An alternative form of line anchor is illustrated in FIG. 7. In this case, the resilient fingers 18' are formed integrally with and located at the base portion of each arm 3' — one at each side thereof.

Although the outer and inner U-shaped members may be made of any suitable material, they are most economically produced as thermoplastic moldings. The choice of material suitable for this purpose is quite broad, but it should be a plastic with good resilience, since the assembly of the inner and outer U-shaped members must be effected by flexing their arms sufficiently to enable the protuberances or bosses 6 to be snapped into their respective sockets 7.

In using the knot tying device to tie together two lines L and R, the U-shaped members 3 and 4 are brought into coplanar relationship so that the four slots 12 and 13 are aligned. The line L, which approaches from the left, is laid into all of the slots and has its free end portion anchored by being wedged under one of the spring fingers 18 at the right hand end of the device. That portion of the line L to the left of the device is then wedged under one of the spring fingers 18 at the left hand end of the device. In effecting this attachment of the line L to the device, the stretch LS of the line L that spans the distance between the inner arms 4' must be drawn taut, and of course will lie at one side of the post 8.

The other line R which approaches from the right, has its free end portion wedged under the other spring finger 18 at the left hand end of the device, is laid into all of the slots with the stretch RS thereof which spans the distance between the arms 4' at the opposite side of the post 8 and then wedged under the other spring finger 18 at the right hand end of the device while drawing the stretch RS taut.

With the lines thus positioned, the inner U-shaped member is rotated. The enlargement or knob 11 on the end of the post 8 guards against disengagement of the lines therefrom during rotation of the inner U-shaped member. Such rotation causes the stretches RS and LS to be wrapped or twisted about one another, and when three or four such twists have been made, the free ends of the lines are detached — one at a time — from the anchors that had been holding them, and then inserted between the medial untwisted portions of the stretches RS and LS at opposite sides of the post. The notch 10 in the distal end of the post enables this insertion to be made, and in fact facilitates that insertion, as will be evident from FIG. 4.

After the condition shown in FIG. 4 is achieved, the lines are detached from the anchors still holding them and then pulled apart to tighten the knot.

Those skilled in the art will appreciate that the invention can be embodied in forms other than as herein disclosed for purposes of illustration.

The invention is defined by the following claims:

I claim:

1. A knot tying device for tying together, with a barrel knot, lines of monofilament and similar difficult-to-tie material, comprising:
   A. an outer U-shaped member having spaced arms;
   B. an inner U-shaped member embraced by said outer U-shaped member and likewise having spaced arms;
   C. coacting coaxial pivot means on the outer end portions of the arms of said inner and outer U-shaped members connecting said members for relative rotation about an axis that passes through the outer end portions of all of the arms;
   D. slots in the extremities of all said arms, the bottoms of which are adjacent to said axis,
      said slots of the inner and outer U-shaped members being aligned and those of adjacent arms forming continuations of one another when said members are in predetermined positions of relative rotation so that two lines which approach one another from opposite ends of the device may have end stretches thereof laid into all of said slots with said stretches spanning the distance between the arms of the inner U-shaped member and substantially parallel to one another and said axis;
   E. a post on said inner U-shaped member between and in line with its arms,
      said post extending beyond said axis to lie between said substantially parallel stretches of the lines; and
   F. anchoring means on said outer U-shaped member for gripping the two lines at points beyond the portions thereof that occupy the slots in the arms of the outer U-shaped member,
      so that upon relative rotation of said inner and outer U-shaped members said stretches of the lines with their medial portions lying at opposite sides of said post are twisted about one another.

2. The knot tying device of claim 1, wherein the bottom of the slots in the extremities of the arms of both U-shaped members is below the axis about which said members are relatively rotatable.

3. The knot tying device of claim 1, wherein said coaxial pivot means comprises a protuberance on each of the arms of one of said members received in a socket in the adjacent arm of the other member.

4. The knot tying device of claim 3, wherein the arms of at least one of said U-shaped members are resiliently displaceable from their normal positions to enable introduction of said protuberances into their respective sockets to effect assembly of the two U-shaped members with one another.

5. The knot tying device of claim 4, wherein said protuberances are outwardly projecting coaxial cylindrical bosses on the arms of the inner U-shaped member, and said sockets open to the inner surfaces of the arms of the outer U-shaped member, and
   wherein the bottom portions of said slots in the extremities of the arms of both U-shaped members embrace the common axis of said cylindrical bosses.

6. The knot tying device of claim 4, wherein both U-shaped members are molded of thermoplastic material so that the arms of both are resiliently displaceable from their normal positions.

7. The knot tying device of claim 1, wherein said post has a notch in its distal end, which notch extends inwardly of the axis about which the outer and inner U-shaped members are relatively rotatable and hence inwardly of the medial portions of lines lying at opposite sides of the post so as to enable the free ends of the lines to be inserted between said medial portions of the lines.

8. The knot tying device of claim 1, wherein said anchoring means comprises a metal stamping embracing and secured to each arm of the outer U-shaped member near the base thereof and having resilient fingers overlying the opposite sides of said arms and biased into snug engagement therewith.

9. The knot tying device of claim 1, wherein the outer U-shaped member is a plastic molding, and
   wherein said anchoring means comprises resiliently deformable fingers formed as integral parts of said molding, each closely overlying one side of the molding near the base of its arms.

* * * * *